(12) United States Patent
Skog et al.

(10) Patent No.: US 8,259,709 B2
(45) Date of Patent: Sep. 4, 2012

(54) METHOD AND ARRANGEMENT FOR CONTROLLING A MULTIMEDIA COMMUNICATION SESSION

(75) Inventors: Robert Skog, Hässely (SE); Mats Stille, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1645 days.

(21) Appl. No.: 11/630,468

(22) PCT Filed: Oct. 8, 2004

(86) PCT No.: PCT/SE2004/001441
§ 371 (c)(1),
(2), (4) Date: Dec. 21, 2006

(87) PCT Pub. No.: WO2006/001740
PCT Pub. Date: Jan. 5, 2006

(65) Prior Publication Data
US 2007/0297390 A1  Dec. 27, 2007

(30) Foreign Application Priority Data
Jun. 29, 2004 (SE) ........................ 0401671

(51) Int. Cl.
*H04L 12/66* (2006.01)
(52) U.S. Cl. ..................... 370/353; 455/432.1; 709/227; 709/249
(58) Field of Classification Search .................. None
See application file for complete search history.

(56) References Cited

U.S. PATENT DOCUMENTS

| | | | |
|---|---|---|---|
| 6,542,462 B1 | 4/2003 | Sohraby et al. | |
| 6,608,832 B2 * | 8/2003 | Forslow | 370/353 |
| 6,944,150 B1 * | 9/2005 | McConnell et al. | 370/352 |
| 7,113,799 B2 * | 9/2006 | Ahmad et al. | 455/458 |
| 7,283,513 B2 * | 10/2007 | Hundscheidt et al. | 370/352 |
| 2002/0110104 A1 * | 8/2002 | Surdila et al. | 370/338 |
| 2002/0122401 A1 * | 9/2002 | Xiang et al. | 370/338 |
| 2003/0026245 A1 * | 2/2003 | Ejzak | 370/352 |
| 2004/0008669 A1 * | 1/2004 | Bos et al. | 370/352 |
| 2004/0252674 A1 * | 12/2004 | Soininen et al. | 370/352 |
| 2005/0163106 A1 * | 7/2005 | Vaittinen et al. | 370/352 |

FOREIGN PATENT DOCUMENTS

| | | |
|---|---|---|
| EP | 1 317 108 A1 | 6/2003 |
| WO | WO 03/055193 A1 | 7/2003 |
| WO | WO-03/003767 * | 9/2003 |

OTHER PUBLICATIONS

International Search Report for PCT/SE2004/001441, mailed Apr. 19, 2005.
Written Opinion for PCT/SE2004/001441, mailed Apr. 19, 2005.

\* cited by examiner

*Primary Examiner* — Brian Roberts
(74) *Attorney, Agent, or Firm* — Potomac Patent Group PLLC

(57) ABSTRACT

A method and arrangement for controlling a multimedia communication session between a first terminal and a second terminal, the session being divided into a circuit-switched part and a packet-switched part. A notification on an event occurring in one of said circuit-switched and packet-switched parts is received in a common session server. The session server then reports to the other part of the communication session about said event, such that said other part can be controlled in response to said event.

16 Claims, 4 Drawing Sheets

METHOD AND ARRANGEMENT FOR CONTROLLING A MULTIMEDIA COMMUNICATION SESSION

This application claims priority and benefit from International Application No. PCT/SE2004/001441, filed Oct. 8, 2004, which claims priority to Swedish patent application No. 0401671-3, filed Jun. 29, 2004, the entire teachings of which are incorporated herein by reference.

TECHNICAL FIELD

The present invention relates generally to a method and apparatus for handling a multimedia communication session divided into a circuit-switched part and a packet-switched part. In particular, the invention is intended to provide control of sessions between terminals involving both circuit-switched voice and packet-switched data such as video, images, text, etc.

BACKGROUND OF THE INVENTION AND PRIOR ART

Fixed and mobile communication terminals have so far been used mainly for making voice calls. Standardised and well-working communication technologies and protocols are then utilised to communicate voice between fixed and/or mobile terminals using circuit-switched communication channels. In particular, radio based circuit-switched channels for mobile terminals have been designed and optimised to provide acceptable quality and reliability for voice calls, at the same time requiring a minimum of bandwidth in order to increase network capacity.

A multitude of new telephony services are now rapidly being developed which can be employed in particular by the introduction of new technologies allowing notably higher transmission rates and increased network capacity. For example, GPRS (General Packet Radio Service) and WCDMA (Wideband Code Division Multiple Access) technologies are currently emerging for enabling wireless telephony services requiring a wide range of transmission rates and different protocols. The trend today is also a move towards packet-switched networks and technologies providing more capacity and flexibility as compared to the traditional circuit-switched networks. Further, new sophisticated mobile terminals are also emerging on the market, equipped with functionality to handle the new services.

Many of these new services involve real-time transmission of video information as well as audio information, and may further involve the transmission of added data representing text, documents, images, audio files and video files in a multitude of different formats and combinations. Such services are generally referred to as "multimedia" services, which term will be used in this description to represent any telephony services that involve the transfer of any data in addition to ordinary voice.

A prevailing goal or ambition is to converge all services on to a single transport mechanism—the packet based Internet Protocol (IP), regardless of the type of access networks and technologies. Recently, a network architecture called "IP Multimedia Subsystem" (IMS) has been developed by the 3$^{rd}$ Generation Partnership Project (3GPP) as an open standard, to give operators of access networks the ability to offer multimedia services in the packet domain. An IMS network, comprising various different network elements to handle the services, can be built above any type of access network and is more or less independent of the access technology used, provided that the access network is able to support the service requirements of IMS in terms of bandwidth, QoS (Quality of Service), etc. Hence, IMS is a platform for enabling services based on IP transport, and is basically not restricted to any limited set of specific services.

However, the packet based IP transport technology is currently not quite suitable for voice communication mainly due to shortcomings in quality and reliability. In short, the difference is that a circuit switched channel is a permanent connection for the duration of a call with a fixed and guaranteed bandwidth, resulting in fairly consistent quality and reliability, whereas in packet switching a connection of variable bandwidth is temporarily established whenever there are any packets to transmit. Packet switching is therefore inherently associated with various unpredictable transmission delays and packet losses that may potentially result in unacceptable variations of quality, bitrate and reliability. In particular, a radio link is typically the critical part of a transmission path due to its limited bandwidth. Transmission delays can therefore be a significant problem for packet-switched radio channels.

As a result, a traditional circuit switched (duplex) voice bearer is currently considered to be better than a packet switched (non-duplex) voice bearer in this respect. Hence, network operators are not yet able to launch all-IP multimedia services involving voice transport with full duplex, in 3G mobile networks.

To overcome these problems, it has been proposed that a multimedia communication session should be divided into a circuit-switched part for the voice transport using a circuit-switched telephony system, and a packet-switched part for the transport of other data using a packet-switched telephony system based on IP technology. According to this proposal, circuit-switched bearers are used for voice, particularly in radio links, whereas completely separate packet-switched bearers are used for other medias. In this way, the high performance associated with the traditional full duplex voice channels is obtained, whereas any other data involved in multimedia services can be adequately supported by packet-switched transport, since it is normally not equally delay-sensitive. This arrangement can also reduce the costs for network operators by utilising existing resources for circuit-switched transmission, as e.g. in GPRS networks having both capabilities.

This solution is schematically illustrated in FIG. 1 where two mobile terminals A and B are engaged in a multimedia communication involving both voice and data. The terminals are connected to access networks, not shown, providing radio access, as schematically illustrated by blocks 100A and 100B, over respective radio channels. Here, it is assumed that each access network has separate architectures and logic systems for circuit-switched and packet-switched transport, respectively.

According to this solution, the communication flow through the various networks and nodes involved in the session between the terminals A and B is divided into a circuit-switched (CS) part and a packet-switched (PS) part. The CS part is transported over a separate circuit-switched logic system, as represented by the block "CS logic" 102. Any other data involved with the used multimedia service, such as video, images, text, etc., which will be called the "PS part" for short hereafter, is transported over a separate packet-switched logic system, as represented by the block "PS logic" 104. It should be noted that FIG. 1 does not show any specific networks or nodes, but simply illustrates how the communication flows are handled logically.

However, a considerable drawback with this solution is that each logic system has its own network service control function. This is schematically illustrated in FIG. 1 as a session control unit "SCU" 102a supporting the circuit-switched part of the session, and another session control unit "SCU" 104a supporting the packet-switched part of the session. For example, the session control unit 104a, may reside within an IMS network as described above and handles the data transport, whereas the session control unit 102a resides within a circuit-switched network and handles the voice transport separately. As a result, different session events occurring in the CS part and the PS part, respectively, will be noticed and handled in isolation from the other part.

For example, the PS part of the communication will be unaware if the CS part is terminated due to, e.g., intentional on non-intentional disconnection of a voice call. In response thereto, it may be desirable that the PS part is then also terminated, or that any other action is taken in the PS part, depending on the nature of the service used. Moreover, the billing function is handled separately by the two system parts, and therefore any common charging and discounting of such multimedia services requires that the two billing functions must somehow be coordinated, e.g. by means of a common billing center or the like.

The problems associated with the control functions having separate session control units are naturally avoided if both voice and data are transported over the same packet-switched logic, as illustrated in FIG. 2, where the PS logic 202 is controlled by means of a single session control unit SCU 202a, e.g. within the context of IMS. However, the above-described problems with voice communication over IP will then remain unresolved.

SUMMARY OF THE INVENTION

It is an object of the present invention to provide a solution for controlling a multimedia communication session involving at least one mobile terminal, wherein quality and reliability for voice transport are acceptable, and wherein service control of all media involved in each session is also obtained. It is another object of the present invention to enable full control of a session which is divided into a circuit-switched part and a packet-switched part, such that one of said parts can take suitable actions in response to events occurring in the other part.

These objects and others are obtained by providing a method and arrangement for controlling a multimedia communication session between a first terminal and a second terminal, said session being divided into a circuit-switched part and a packet-switched part. According to the inventive solution, a notification is received in a common session server, on a session event occurring in one of said circuit-switched and packet-switched parts. The common session server then reports this event to the other part of the communication session, such that said other part can be controlled in response to said event.

According to various examples, the circuit-switched part may be a voice call and the packet-switched part may be used to communicate at least one media stream with data for video, text, game and/or images. The packet-switched part of the communication session may include an IMS (IP Multimedia Services) session or an MMS (Multimedia Message Service) session.

If the first terminal is currently connected to an access network and belongs to a home network different from the access network, and said session event occurs in the circuit-switched part, the access network may inform the home network on the session event, and said event notification is then received at the common session server from the home network.

An MSC (Mobile Switching Center) of the access network may send information on the session event to an IN (Intelligent Network) node of the home network, and said event notification is then received from the IN node. The MSC may send the session event information to the IN node by means of an "IN trigger" or "Parlay".

If the first terminal is currently connected to an access network and the session event occurs in the circuit-switched part, the event notification may alternatively be received at the common session server directly from the access network, regardless of whether the terminal belongs to a home network different from the access network or not.

If a voice call is first started in the circuit-switched part, registration information on the started voice call is preferably received in the common session server. When an application is then activated in the packet-switched part during said voice call, the common session server preferably provides said registration information to the application.

The step of reporting to the other part of the communication session about said event is preferably based on an event subscription established for said other part. In that case, certain session events may have been selected as being relevant for said event subscription depending on at least one of: a provided multimedia service, and preferences and policies of the operator providing said multimedia service.

Actions may be taken in response to session events depending on at least one of: a provided multimedia service, preferences and policies of the operator providing said multimedia service, and user preferences. In different embodiments, the packet-switched part may be suspended in response to suspension of the circuit-switched part, and may automatically be resumed when the circuit-switched part is resumed. The packet-switched part may also be terminated in response to termination of the circuit-switched part. In that case, the packet-switched part may be automatically terminated after a predetermined time delay period after termination of the circuit-switched part, unless a terminal user has terminated the packet-switched part.

In further embodiments, the packet-switched part may be terminated in response to suspension of the circuit-switched part, or may be maintained even if the circuit-switched part is suspended or terminated.

The present invention also encompasses a session server for controlling a communication session between a first terminal and a second terminal, the session being divided into a circuit-switched part and a packet-switched part. The session server comprises means for receiving information on events occurring in one of said circuit-switched and packet-switched parts, and means for reporting to the other part of the communication session about said events, such that said other part can be controlled in response to said events.

Preferably, the receiving means comprises a first receiving unit adapted to receive event reports from a CS (circuit-switched) logic system of said circuit-switched part, and the reporting means comprises a first sending unit adapted to send event notifications of the circuit-switched part to a PS (packet-switched) logic system of said packet-switched part.

The receiving means may further comprise a second receiving unit adapted to receive event subscription requests from the PS logic system. The second receiving unit may be further adapted to receive event reports from the PS logic system.

The first receiving unit may be further adapted to receive event subscription requests from the CS logic system. Said reporting means may further comprise a second sending unit adapted to send event notifications of the packet-switched part to the CS logic system.

The server may further comprise a central logic unit connected to each of said sending and receiving units, and which is adapted to process messages and information received by the receiving unit(s), and to prepare messages and information to be sent from the sending unit(s).

Preferably, the server further comprises a session database connected to said logic unit, which is adapted to store relevant session information on at least one of the circuit-switched and packet-switched parts. The logic unit may be further adapted to retrieve relevant session information from the session database in order to provide such information to the sending unit(s).

Further features of the present invention and its benefits will be explained in the detailed description below.

BRIEF DESCRIPTION OF THE DRAWINGS

The present invention will now be described in more detail by means of preferred embodiments and with reference to the accompanying drawings, in which.

DESCRIPTION OF PREFERRED EMBODIMENTS

Figure 2:
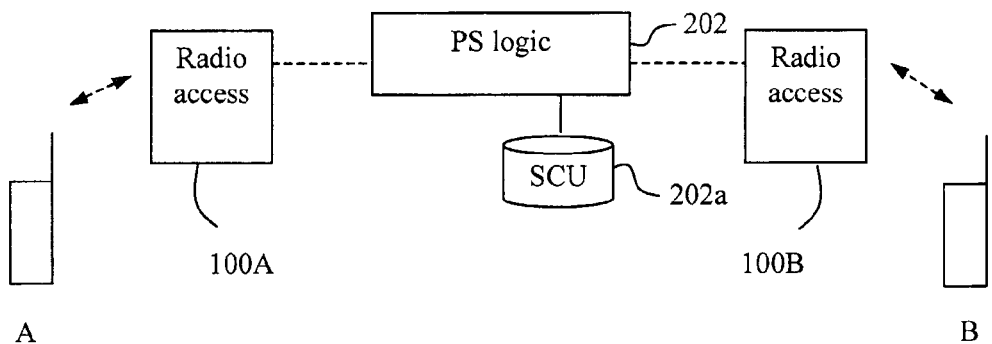
FIG. 2 is a schematic view of a multimedia communication session, according to another previously known solution.
Figure 3:
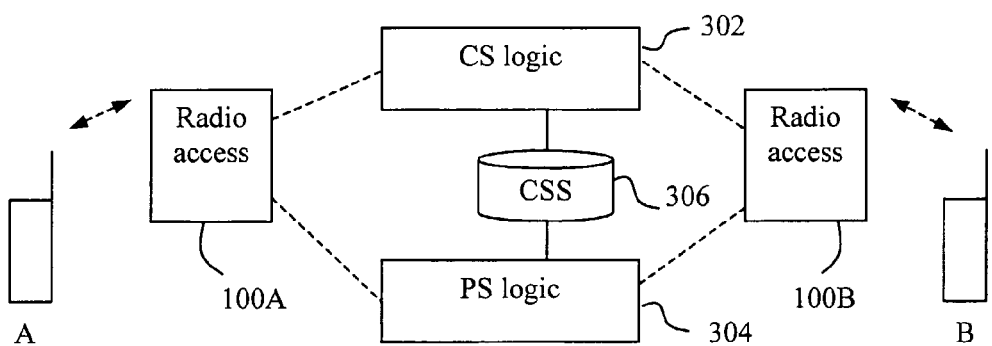
FIG. 3 is a schematic view of a multimedia communication session, according to the present solution.

The main features of the present solution will now be briefly described with reference to FIG. 3, schematically illustrating a multimedia communication session between two mobile terminals A and B. The session is carried out according to a specific multimedia service that has been invoked by either of the two terminals, involving both voice and other data as previously described. Just as in the sessions illustrated in the FIGS. 1 and 2, the terminals A and B are in radio access, as schematically illustrated by blocks 100A and 100B, respectively, with their respective access networks by means of suitable radio connections. For each radio access, the different medias of the multimedia session may be multiplexed onto a single common radio channel, e.g. in different timeslots within the channel if TDMA (Time Division Multiple Access) technology is used, or the different medias may alternatively be transmitted in separate radio channels, depending on the configuration of the terminals.

Figure 1:
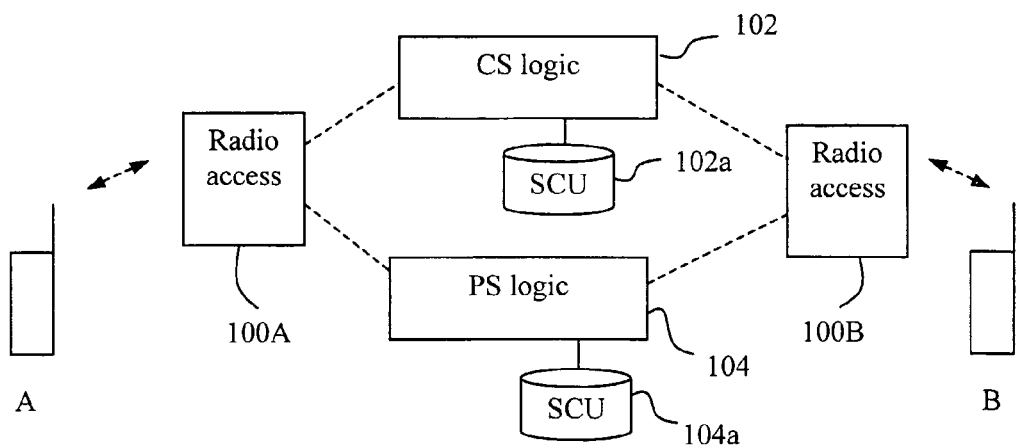
FIG. 1 is a schematic view of a multimedia communication session, according to a previously known solution.

In the present solution, the communication flow between the terminals A and B is divided into a CS part and a PS part, just as in the above-described prior solution shown in FIG. 1. Thus, voice is transported by means of a separate circuit-switched logic system, CS logic 302, and other data is transported by means of a separate packet-switched logic system, PS logic 304. The CS logic 302 thus comprises network elements or nodes handling circuit-switched voice, e.g. MSC (Mobile Switching Center), IN (Intelligent Network) node, HSS (Home Subscriber Server) or HLR (Home Location Register). On the other hand, the PS logic 304 comprises network elements or nodes handling packet-switched data, e.g. GGSN (Gateway GPRS Support Node), SGSN (Serving GPRS Support Node) and various nodes in IMS.

The PS part of the session may again include video, images, text, etc., i.e. any type of data involved in the used multimedia service. By way of example, the terminal users may have a conversation while at the same time pictures or documents are exchanged, or a camera is running in one or both of the terminals for visual contact, or a shared electronic game is played on the terminals.

According to the present solution, a new combined service control function is established, illustrated in FIG. 3 as a common session server CSS 306, serving both the CS part (for voice) and the PS part (for other data) of the session. CSS 306 is thus connected both to the CS logic 302 and to the PS logic 304, and is adapted to collect and store information on any events occurring in both parts of the session. Hence, whenever a session event occurs in either of the CS and PS parts of the session, that event is reported to the common session server CSS 306 by the logic system of that part, and suitable information related to the event is stored in the CSS 306.

In this concept, a "session event" may be that a certain media type is started, suspended (i.e. paused temporarily) or terminated, such as when an ongoing voice communication is disconnected (CS part event), or the exchange of text messages or images is started (PS part event). The logic system for one part of the session may subscribe to selected events occurring in the other part, and vice versa, and certain actions may be taken in response to such events. For example, if a voice call gets disconnected or put on hold, the CS logic 302 reports that event to the CSS 306, such that the PS logic 304 can be notified and then act accordingly.

The actions to be taken by one part in response to specific events occurring in the other part may depend on the nature of the invoked service(s), but also on the policies and preferences of the network operator as well. For example, if a "chat" application is activated in the PS part involving the exchange of text messages during an ongoing voice call, one operator may decide that no action is to be taken in the CS part, whereas another operator may assume that the users want to disconnect the voice call and continue their communication by text chatting only.

In another example, if a session involves both video and voice, the operator may decide whether the video application is to be terminated or not whenever the voice part is terminated, and vice versa. Further, the operator may control the session parts such that an action is taken in one session part after a predetermined time delay period has passed since being notified of an event in the other session part. For example, upon disconnection of the voice part during a voice/video session, the video part may be automatically terminated after a certain short delay, e.g. 3 seconds, unless the users have initiated disconnection by themselves within that time period. In other words, the operator may wish the network to take an action to release the video part if the terminal fails to disconnect the video part within the 3 seconds.

By having a common session server for storing session events occurring in either the CS part or the PS part of the session, the operator offering the multimedia services will gain full network control over both session parts, since the packet-switched network can monitor the activities of the circuit-switched network, and vice versa.

Figure 4:
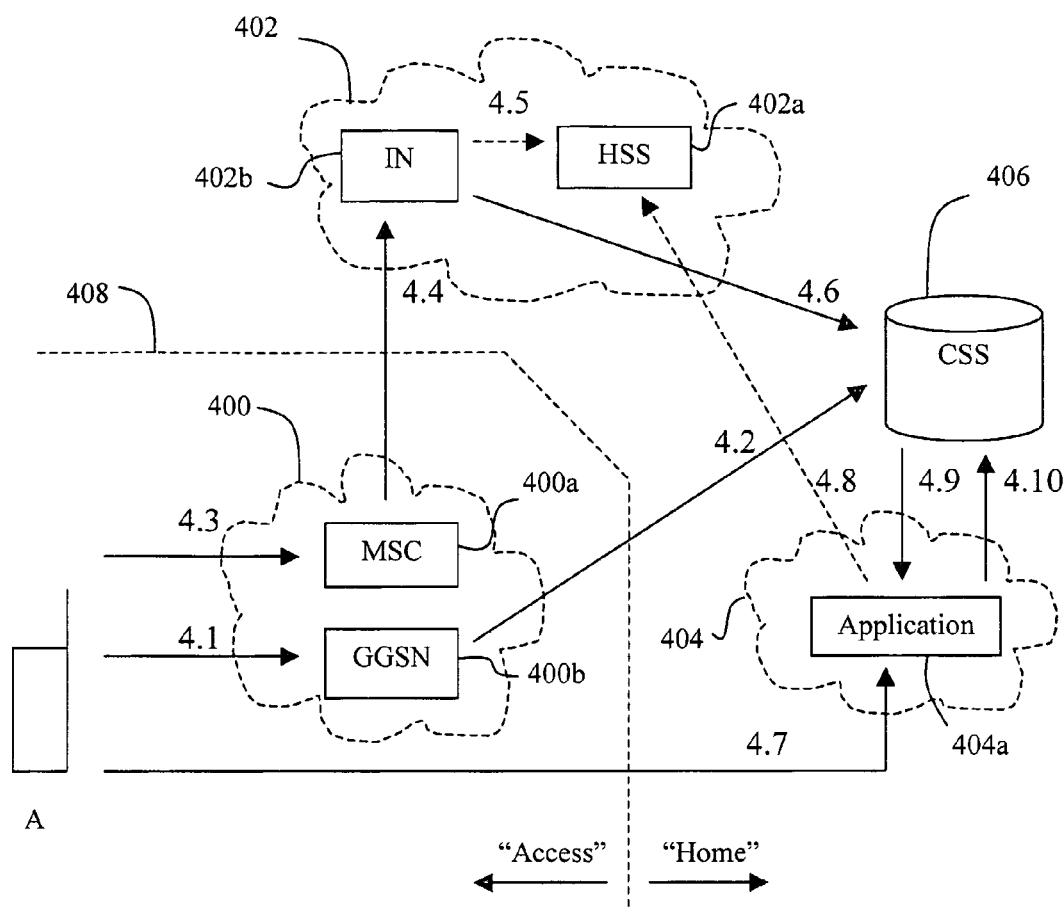
FIG. 4 is a signalling diagram illustrating a first embodiment of a procedure for initiating a multimedia session.

A first embodiment of a procedure for initiating a multimedia session between two mobile terminals will now be described. The session involves both voice and data transmitted over separate logic systems basically as outlined in FIG. 3, i.e. using separated circuit-switched and packet-switched transports. FIG. 4 illustrates a basic signalling diagram between the different nodes involved in a session setup according to the present embodiment, although other nodes may be used to perform similar actions in other network configurations. The two mobile users, of which only one (terminal A) is shown, will both talk and visually share another media at the same time. By way of example, this shared media may be a still image, a 1-way live video, a text or a game application.

In the IMS context, a multitude of different services have been created involving the communication of visual media such as images, texts and/or video, to be shared in parallel to a speech call. Such services require the activation of various applications. Generally in this description, the generic term "application" will be used to represent any application or set of applications, apart from ordinary voice, required to provide a particular requested multimedia service.

The shown terminal A is connected to a combined GSM/GPRS access network 400 having both circuit-switching and packet-switching capabilities. The access network 400 comprises an MSC (Mobile Switching Center) 400a for routing circuit-switched voice according to the GSM standard, and a GGSN (Gateway GPRS Support Node) 400b for routing packet-switched data according to the GPRS standard. In this case, the terminal actually belongs to a "home" network 402 by means of subscription or other registration, and is currently roaming in the access network 400 which thus can be regarded as a "visited" network. It should be noted that the present invention can also be used when the terminal is directly connected to its home network 402, which then naturally acts as an access network.

The home network 402 includes an HSS (Home Subscriber Server) 402a (in some systems also called HLR (Home Location Register)), and an IN (Intelligent Network) node 402b. For the circuit-switched part, the MSC 400a thus acts as a "Service Switching Point (SSP)" in the access network 400, and the IN node 402b acts as a "Service Control Point (SCP)" in the home network 402. Logically speaking, in the circuit-switched part, the MSC 400a belongs to the "control layer", the IN node 402b and the HSS 402a both belong to the "services layer", whereas the access network 400 further comprises a radio network (not shown) making up the "connectivity layer".

FIG. 4 further illustrates a "multimedia service network" 404 configured to operate in collaboration with the home network 402. Typically, networks 402 and 404 are controlled by the same network operator. The service network 404 includes an "application" 404a, which is invoked by the terminal A in this example to provide a multimedia service. The service network 404 may be any type of network providing multimedia services, e.g. an IMS network or MMS (Multimedia Message Service) network. Further, an "application node", not shown in the figure, in the service network 404 operates the application 404a to provide any service requiring that application.

Finally, a common session server CSS 406 is in communication on one hand with the application 404a to report session events, and on the other hand with the IN 402b and GGSN 400b, respectively, to receive event information. As indicated by means of a dashed border line 408, the illustrated network structure is divided into an access side including the access network 400, and a home side including the home network 402, the service network 404 and the CSS 406. Consequently, one operator controls the home side and another operator controls the accessed side of this network structure, at least with respect to the executed multimedia session in this example.

In this embodiment, a circuit-switched voice connection is first established, and then a multimedia service is activated at a later stage, thereby adding another media requiring a packet-switched data connection in parallel to the voice connection. Firstly, a PDP context is established by the GGSN 400b when the terminal A initially accesses the network 400 in a first step 4.1, as to prepare for any upcoming data session. Establishing a PDP context includes allocating a temporary IP address to the terminal A in order to be able to communicate data packets with the terminal in the future. Basically, the PDP context can be established at any time, e.g. when the terminal is powered on.

In a next step 4.2, the GGSN 400b sends updated registration information on the terminal A to the CSS 406, including its terminal IP address and mobile identity, such as MSISDN (Mobile Station ISDN (Integrated Services Digital Network) Number). Further session information may also be sent in this step, such as IMSI (International Mobile Subscriber Identifier), APN (Access Point Name), QoS parameters, SGSN address, etc. In this way, terminal A becomes registered in the CSS 406 as an active terminal by means of any necessary address/identity information.

After this first terminal registration step, terminal A starts an ordinary voice call by calling a terminal B, and according to the following step 4.3, a circuit-switched session begins over the MSC 400a of the access network 400. In response thereto, the MSC 400a sends specific "call-start" information to the IN node 402b in a step 4.4, to inform the home network 402 on the started call. In this message, at least the A-number of terminal A and the B-number of terminal B are provided, and possibly also a charging identity. In a preferred embodiment, the call-start information is conveyed to the IN node 402b by means of a so-called "IN trigger", which is an existing message that can easily be used for this purpose.

In an optional next step 4.5 (dashed arrow), the IN node may request the address of the CSS 406 to which terminal A belongs, from the HSS 402a. Thus, the HSS has such information stored regarding subscribers and/or terminals belonging to the home network 402. Alternatively, the CSS address may already be stored, e.g. hard-coded, in the IN node. In that case, step 4.5 can of course be omitted, and the CSS address can be retrieved internally instead. Thereafter in a step 4.6, the IN node 402b sends relevant CS-related registration information to the CSS 406, such as the above-mentioned call-start information including the charging identity defined for the voice call, if received in step 4.4.

At some point after having started the voice call, terminal A activates the application 404a in the service network 404 in a step 4.7, by invoking a multimedia service requiring that application. Terminal A makes this service request over the GGSN 400b in the packet-switched part of access network 400 and a "core network" part (not shown) of the service network 404.

The application 404a now responds by collecting CS-related information from the CSS 406. Similar to step 4.5 above, the application may first request the address of the CSS 406 of terminal A from the HSS 402a, in an optional step 4.8 (dashed arrow). However, the CSS address may already be stored, e.g. hard coded, in the service network node running the application 404a, and can then be retrieved internally instead. In that case, step 4.8 is omitted, as similar to step 4.5.

Thus in a next step 4.9, the application 404a fetches and receives certain session information from the CSS 406, such as the charging identity and/or other relevant CS-related registration information on the terminal A sent from the IN node 402*b* to the CSS 406 in step 4.6 above. Finally in a step 4.10, the application 404*a* sends a subscription request to the CSS 406 for certain selected session events that may occur in the CS part of the session. Here, the application may subscribe to specific session events that are relevant for the service provided, and also in accordance with preferences and policies of the operator.

After that, throughout the session, the application will automatically be notified by the CSS 406 whenever such events occur in the voice part, and can act accordingly. Also, the CS part of the session can likewise be notified by the CSS, not illustrated, on any relevant session events occurring in the PS part. Such PS events are then preferably reported to the IN node 402*b*.

Figure 5:
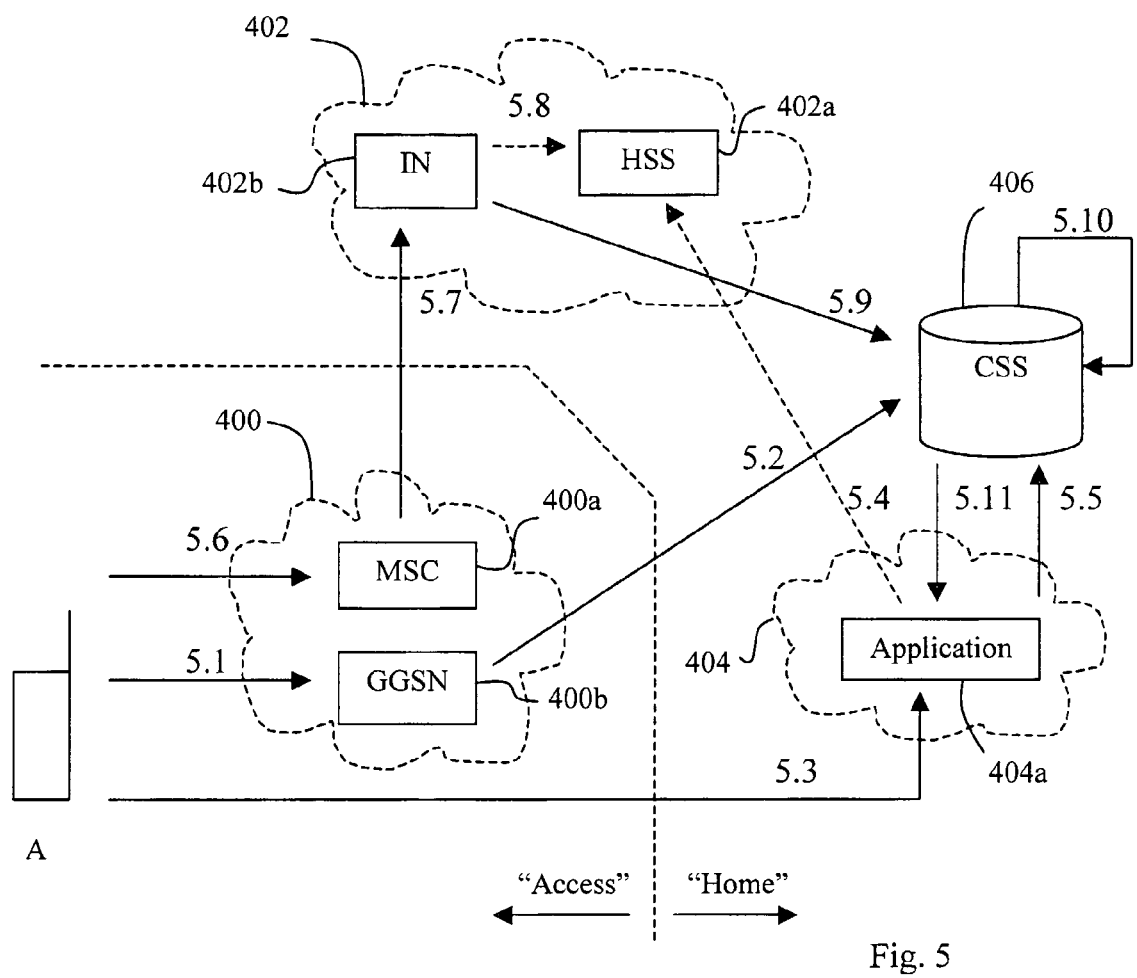
FIG. 5 is a signalling diagram illustrating a second embodiment of a procedure for initiating a multimedia session.

A second embodiment of a procedure for initiating a multimedia session between two mobile terminals A and B will now be described, with reference to FIG. 5. This embodiment uses the same network components and structure as in the above-described first embodiment of FIG. 4, having the same numeral references in FIG. 5, and no repeated description thereof is given here. In this case however, a packet-switched data connection is established before a circuit-switched voice connection is established at a later stage, according to the second embodiment.

The first step 5.1 of creating a PDP context and the next step 5.2 of sending registration information on the terminal A from GGSN 400*b* to CSS 406, are basically the same as steps 4.1 and 4.2, respectively, in the first embodiment.

However, by first invoking a service involving data but not voice, e.g. a chat or game service, terminal A now activates the application 404*a* in a further step 5.3, to initiate a PS-session with another terminal before any voice call (CS-session) has been started. In response thereto, the application may first perform an optional step 5.4 (dashed arrow) of requesting the CSS address of terminal A from the HSS 402*a*, unless the CSS address is already stored, e.g. hard coded, in the corresponding application node. If so, step 5.4 is naturally omitted just like step 4.8 of the first embodiment.

The application 404*a* then sends a subscription request to the CSS 406 in a next step 5.5, for session events that may occur in a possibly upcoming voice part of the session, even though as yet, no voice call has been started. In this way, CSS 406 will know that as soon as a voice call is started between the same terminals, relevant session information is to be sent to the application 404*a*, having in fact established an event subscription "in advance". Just as in the first embodiment of FIG. 4, the application may only subscribe to "relevant" events, as explained above.

At some point thereafter, terminal A starts a voice call with terminal B, and in the following step 5.6, a circuit-switched session begins over the MSC 400*a* of the access network 400. Just as in step 4.4 in the first embodiment, the MSC 400*a* then sends specific "call-start" information to the IN node 402*b* in a next step 5.7, to inform the home network 402 on the started voice call, again preferably by means of an IN trigger. In response thereto, the IN node 402*b* may first perform an optional step 5.8 (dashed arrow) of requesting the CSS address of terminal A from the HSS 402*a*, unless the CSS address is already stored, e.g. hard coded, in the application node. If so, step 5.8 is naturally omitted. Then, the IN node 402*b* sends relevant CS-related registration information to the CSS 406, in a step 5.9, such as the above-mentioned call-start information, as in step 4.6 in the first embodiment.

The next step 5.10 illustrates that the CSS 406 concludes, by detecting the event subscription established in step 5.5, that the application 404*a* is to be notified on the event that the voice call has started. Accordingly, the CSS 406 does so by sending CS-related session information to the application, in a next step 5.11, such as the charging identity and/or other relevant registration information on the terminal A that was sent from the IN node 402*b* to the CSS 406 in step 5.9 above. Thereafter, the PS part of the session, i.e. the application, will automatically be notified by the CSS 406 whenever further session events occur in the CS part, and vice versa.

A third embodiment of a procedure for reporting a call event during a multimedia session will now be described, with reference to the signalling diagram illustrated in FIG. 6. In this embodiment, the same components and network structure as in the previous embodiments are used, and the same numeral references thereof are thus re-used once more, without repeated explanation.

More specifically, the third embodiment concerns the example when an ongoing circuit-switched voice call between a first terminal A and a second terminal B (not shown) is temporarily put on hold, e.g. as one of the terminal users has pressed a "call-hold" button or the like. This embodiment is a procedure for propagating that session event in the CS part to the PS part of the session. It is assumed that the operator has decided that in this situation, the packet-switched application should also be suspended until the voice call resumes. The operator has further decided that the packet-switched application will be suspended automatically if no PS application "stop message" is received from the terminal A, as input by its user, within a predetermined time period of three seconds.

In a first step 6.1, terminal A puts an ongoing voice call on hold, which is registered by the MSC 400*a* in the access network 400. For example, terminal A may receive a call from a third terminal that is answered as the ongoing call with the second terminal is temporarily put on hold, to be resumed later. A next step 6.2 simply illustrates that the MSC puts the call on hold.

The MSC 400*a* then sends specific "call-hold" information to the IN node 402*b* in a step 6.3, again preferably by means of an IN trigger, to inform the home network 402 that the call has been suspended. This message contains the A-number and B-number. Again, just as in steps 4.5 and 5.8 in the first and second embodiments above, respectively, the IN node may request the CSS address of terminal A from the HSS 402*a* in an optional step 6.4. However, if the CSS address is already stored, e.g. hard coded, in the application node, step 6.4 is naturally omitted. Alternatively, the MSC 400*a* may directly inform the CSS 406 on the "call-hold" situation in an alternative step 6.3a, if the MSC 400*a* is not obliged to send the "call-hold" information to the IN node 402*b* as in step 6.4. In that case, the MSC 400*a* may first utilise the HSS 402*a* to retrieve the CSS address of terminal A. Moreover, in the case when the terminal is directly connected to its home network (which thereby acts as the access network), the MSC thereof can directly inform the CSS 406 on the "call-hold" situation, or any other events occurring in the CS part.

Thereafter, the IN node 402*b* reports the call suspension event in the CS part of the session to the CSS 406, by sending a suitable "call-hold" message thereto in a step 6.5, including the A-number and B-number. Step 6.6 illustrates that, in response to receiving the event report in the previous step 6.5, the CSS detects that the application 404*a* has established a subscription for CS events with the CSS 406, and it should therefore be notified accordingly. Thus in a next step 6.7, the CSS 406 sends a notification message with information on the CS "call-hold" event to the application 404*a*.

Finally, a step 6.8 illustrates that the application first waits during the above-mentioned delay period of three seconds, and if no stop message has been received from the terminal A during this period, the application suspends the PS part of the session as well, to be resumed automatically whenever the CS voice call is resumed. However, the operator may alternatively decide that the application in the PS part should be terminated completely in this situation, such that the user must actively start the application again if he/she wants to run the PS application further in parallel with the voice call, once resumed. In that case, the user may be automatically notified or prompted to restart the application as the voice call is resumed.

Figure 6:
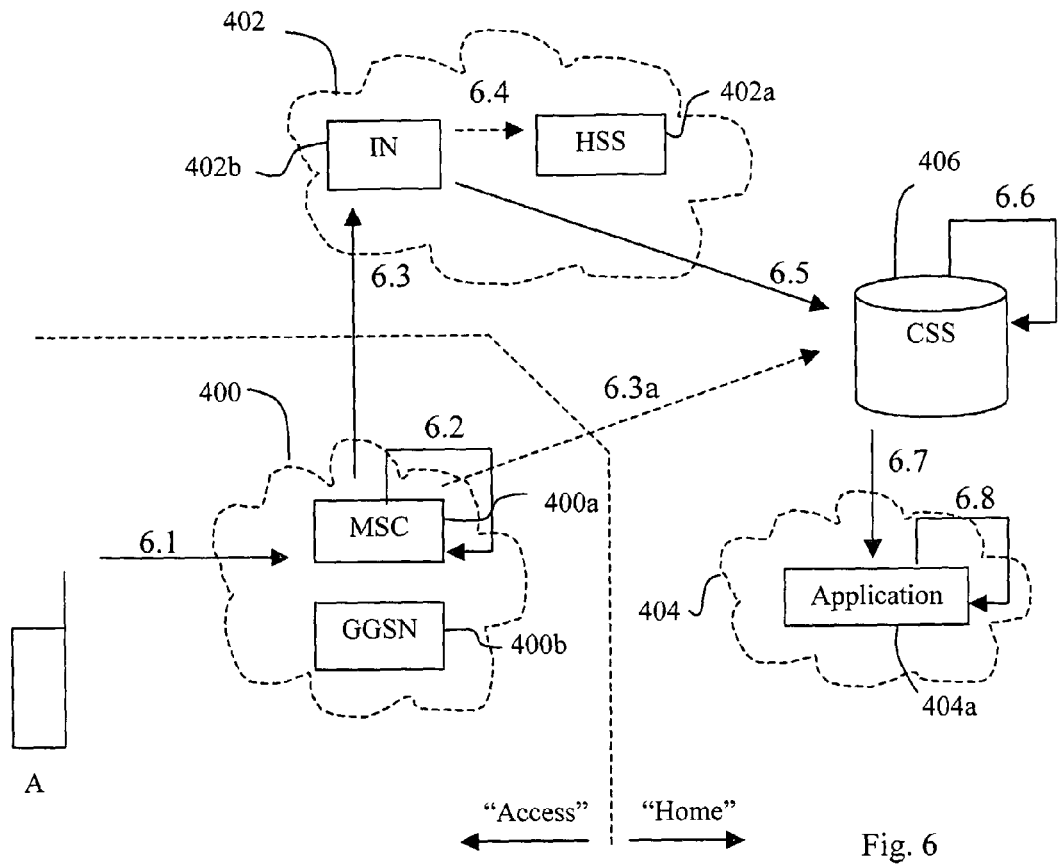
FIG. 6 is a signalling diagram illustrating a third embodiment of a procedure for reporting a call event during a multimedia session.

In the example of FIG. 6 above, the PS part was notified when a call event occurred in the CS part. The present invention is further intended to encompass the opposite case when the CS part of the session is notified by the CSS 406 whenever session events occurring in the PS part. For example, if a chat application involving text messages is started in the PS part during an ongoing voice call in the CS part, it may be relevant to terminate the CS part, or at least to put it on hold temporarily. As mentioned above, the different alternative actions that can be taken by one session part in response to specific session events in the other session part may depend on the service invoked as well as on preferences and policies of the operator of that session part.

Furthermore, the actions to be taken may also depend on user preferences, such that the terminal user may be given the opportunity to set his/her own preferences in his/her subscription, or simply in connection with starting a multimedia session. For example, one user may select that the PS part of a session should be suspended when the CS part is suspended and then be automatically resumed as the CS part is resumed, whereas another user may select that the PS part of a session should be terminated when the CS part is suspended, thereby having the freedom to re-start the same application or start another one as the CS part is resumed.

In the examples described above, the existing IN trigger was used for reporting CS call events from the MSC 400a to the home network 402. However, it should be noted that any CS or PS session events can be reported to the home network 402, or directly to the CSS 406, in any suitable way by means of existing or new messages, and the present invention is not limited in this respect. For example, the existing "Parlay" message may be used instead of the above-described use of IN-trigger.

Figure 7:
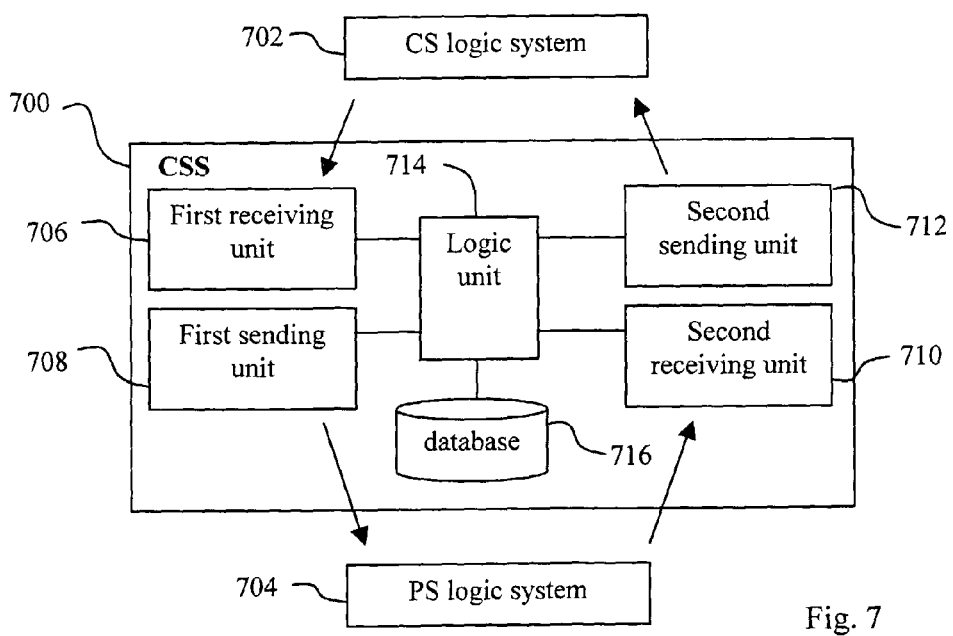
FIG. 7 is a schematic block diagram of a common session server node according to a preferred embodiment.

In FIG. 7, a schematic block diagram is shown of a common session server CSS 700 according to a preferred embodiment. Similar to the situation shown in FIG. 3, the CSS 700 is connected to a circuit-switched logic system 702 and a packet-switched logic system 704.

In more detail, the CSS 700 comprises a first receiving unit 706 adapted to receive event reports from the CS logic system 702, e.g. according to steps 4.6 (receiving CS "call-start" information from IN node 402b), 5.9 (receiving CS "call-start" information from IN node 402b) and 6.5 (receiving the "call-hold" message from IN node 402b) in the exemplary procedures described above. Optionally, the first receiving unit 706 may also be adapted to receive event subscription requests from the CS logic system 702, if it is desirable to control the CS part based on events in the PS part.

The CSS 700 also comprises a first sending unit 708 adapted to send session information and event notifications of CS sessions to the PS logic system 704, e.g. according to steps 4.9 (sending session information to application 404a), 5.11 (sending session information to application 404a) and 6.7 (sending "call-hold" notification to application 404a) in the exemplary procedures described above.

The CSS 700 further comprises a second receiving unit 710 adapted to receive event subscription requests and event reports from the PS logic system 704, e.g. according to steps 4.2 (receiving registration information from GGSN 400b), 4.10 (receiving subscription request from application 404a) and 5.5 (receiving subscription request from application 404a) in the exemplary procedures described above.

The CSS 700 also comprises a second sending unit 712 adapted to send session information and event notifications of PS sessions to the CS logic system 702, if it is desirable to control the CS part based on events in the PS part.

To build such receiving and sending units 706, 708, 710 and 712 in order to provide suitable receiving and sending functionality for the necessary communication with the CS and PS logic systems 704 and 702, respectively, is considered to lie within the abilities of a skilled person. Therefore, the detailed structures of these units 706, 708, 710 and 712 will not be described here.

The CSS 700 further comprises a central logic unit 714 that is connected to each of the receiving and sending units 706, 708, 710 and 712. The logic unit 714 is adapted to process messages and information received by the first and second receiving units 706 and 710, e.g. according to steps 5.10 and 6.6 (detecting event subscription of application 404a) in the exemplary procedures described above, and to prepare messages and information to be sent from the first and second sending units 708 and 712.

The CSS 700 further comprises a session database 716 connected to the logic unit 714, which is adapted to store relevant session information on at least one of the circuit-switched part and the packet-switched part of an ongoing session, e.g. according to steps 4.6 (storing "call-start" information), 5.9 (storing "call-start" information) and 6.5 (storing "call-hold" event) in the exemplary procedures described above. The logic unit 714 is further adapted to retrieve relevant session information from the session database 716 in order to provide such information to the sending units 708 and 712, e.g. according to steps 4.9 (providing session information), 5.11 (providing session information) and 6.7 (providing "call-hold" information) in the exemplary procedures described above.

It should be noted that FIG. 7 is only intended to logically illustrate the functional blocks in the CSS, which may be physically implemented in numerous ways by means of suitable hardware/software structures. Moreover, any of the receiving and sending units 706-712 may be omitted depending on which functions are requested.

For example, the CSS 700 may comprise the first receiving unit 706 for receiving event notifications from the CS logic system, the second receiving unit 710 for receiving event subscription requests from the PS logic system 704, and the first sending unit 708 for providing CS-session information and events to the PS logic system 704. The second sending unit 712 may thus be omitted if it is desirable only to report CS events to the PS logic system 704, and not to report PS events to the CS logic system 702.

Furthermore, the present solution is also applicable if one of the communicating terminals is a mobile terminal and the other one is a fixed communication terminal, e.g. a telephone or computer. As mentioned above, the present solution is also applicable if a terminal is directly connected to its home network, instead of roaming in a separate access network as in the described examples of FIGS. 4-6. In that case, the access/home network can report events directly to the CSS. Hence, the present invention is intended to encompass all such possible implementations and modifications, within the scope of the appended claims.

Utilising the described inventive solution when a multimedia session is divided into a circuit-switched part and a packet-switched part, the operator handling the multimedia session easily obtains full network control over both parts of the session, by means of storing and providing information of both parts in the common session server. In particular, it is a great benefit that this solution does not require substantial modifications of existing circuit-switched and packet-switched logic systems, since the main functional capabilities lie within the inventive common session server. In particular, the existing "IN trigger" or "Parlay" can easily be used for providing CS-related session information, as described above. Moreover, billing functions can be coordinated for the two system parts, thereby enabling, e.g., common charging and discounting of multimedia services without requiring a specific common billing center or the like.

While the invention has been described with reference to specific exemplary embodiments, the description is in general only intended to illustrate the inventive concept and should not be taken as limiting the scope of the invention, which is defined by the appended claims.

The invention claimed is:

1. A method of controlling a multimedia communication session between a first terminal and a second terminal, said multimedia communication session being divided into a circuit-switched part using a separate circuit-switched logic system comprising network elements or nodes handling circuit-switched voice, and a packet-switched part using a packet-switched logic system comprising network elements or nodes handling packet-switched data, comprising the following steps, executed by a common session server connected to and serving both the logic system of the circuit-switched part and the logic system of the packet-switched part:

receiving a notification on a session event occurring in one of said circuit-switched and packet-switched parts, from the logic system of that one part of the multimedia communication session, reporting to the logic system of the other part of the multimedia communication session about said session event, wherein said other part is controlled in response to said session event, and wherein the first terminal is currently connected to an access network and belongs to a home network different from the access network, and said session event occurs in the circuit-switched part, wherein the access network informs the home network on the session event, and that said notification on the session event is received at the common session server from the home network.

2. The method according to claim 1, wherein the circuit-switched part is a voice call.

3. The method according to claim 1, wherein the packet-switched part is used to communicate at least one media stream with data for video, text, game and/or images.

4. The method according to claim 3, wherein the packet-switched part of the multimedia communication session may include an IP Multimedia Services (IMS) session or an Multimedia Message Service (MMS) session.

5. The method according to claim 1, wherein an Mobile Switching Center (MSC) of the access network sends information on the session event to an Intelligent Network (IN) node of the home network, and that said notification on the session event is received from the IN node.

6. The method according to claim 5, wherein the MSC sends said information on the session event to the IN node by means of an "IN trigger" or "Parlay".

7. The method according to claim 1, wherein a voice call is first started in the circuit-switched part, wherein registration information on the started voice call is received in the common session server, and that when an application is activated in the packet-switched part during said voice call, the common session server provides said registration information to the application.

8. The method according to claim 1, wherein said step of reporting to the logic system of the other part of the multimedia communication session about said event is based on an event subscription established for said other part.

9. The method according to claim 8, wherein certain session events have been selected as being relevant for said event subscription depending on at least one of: a provided multimedia service, and preferences and policies of the operator providing said multimedia service.

10. The method according to claim 1, wherein actions are taken in response to session events depending on at least one of: a provided multimedia service, preferences and policies of the operator providing said multimedia service, and user preferences.

11. The method according to claim 10, wherein said packet-switched part is suspended in response to suspension of the circuit-switched part.

12. The method according to claim 11, wherein the packet-switched part is automatically resumed when the circuit-switched part is resumed.

13. The method according to claim 10, wherein said packet-switched part is terminated in response to termination of the circuit-switched part.

14. The method according to claim 13, wherein the packet-switched part is automatically terminated after a predetermined time delay period after termination of the circuit-switched part, unless a terminal user has terminated the packet-switched part.

15. The method according to claim 10, wherein said packet-switched part is terminated in response to suspension of the circuit-switched part.

16. The method according to claim 10, wherein said packet-switched part is maintained even if the circuit-switched part is suspended or terminated.

* * * * *

UNITED STATES PATENT AND TRADEMARK OFFICE
CERTIFICATE OF CORRECTION

PATENT NO. : 8,259,709 B2  
APPLICATION NO. : 11/630468  
DATED : September 4, 2012  
INVENTOR(S) : Skog et al.

Page 1 of 1

It is certified that error appears in the above-identified patent and that said Letters Patent is hereby corrected as shown below:

On the Title Page, in Item (75), under "Inventors", in Column 1, Line 1, delete "Hässely" and insert -- Hässelby --, therefor.

In the Specification:

In Column 5, Line 40, delete "DESCRIPTION" and insert -- DETAILED DESCRIPTION --, therefor.

Signed and Sealed this  
Thirteenth Day of August, 2013

Teresa Stanek Rea  
*Acting Director of the United States Patent and Trademark Office*